Dec. 7, 1965  R. L. ACRES  3,221,794
CAPTIVE FASTENER
Filed Dec. 9, 1963
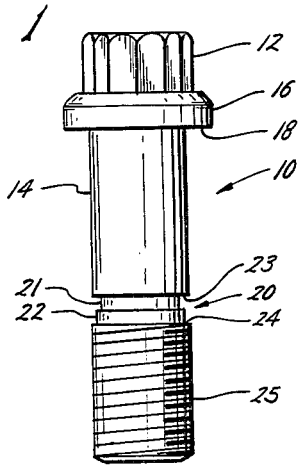
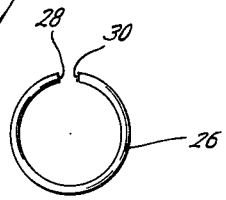
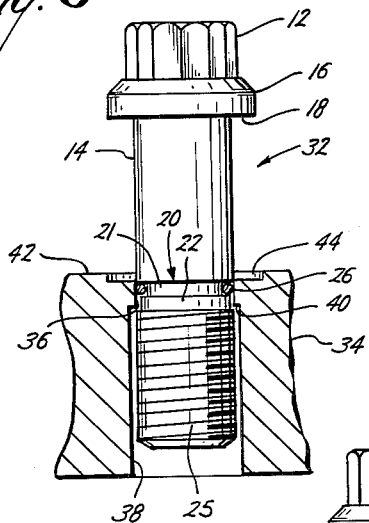
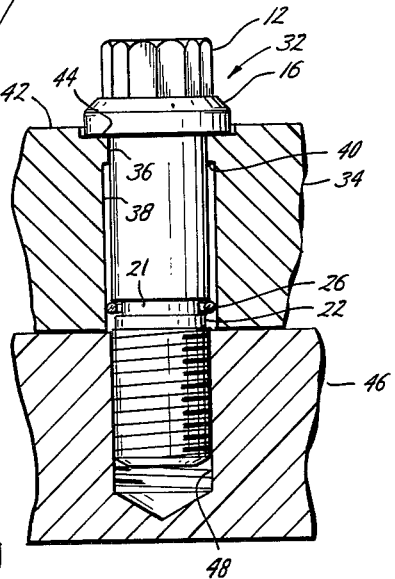
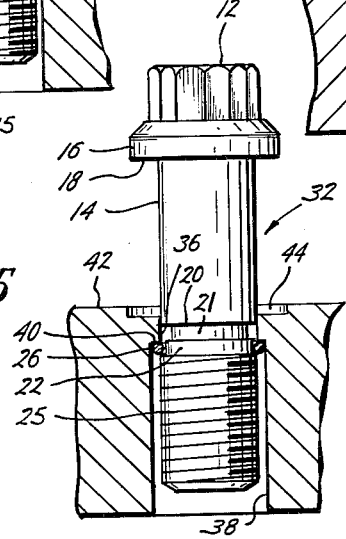
Richard L. Acres
INVENTOR.
BY
ATTORNEYS United States Patent Office 3,221,794
Patented Dec. 7, 1965

3,221,794
CAPTIVE FASTENER
Richard L. Acres, Houston, Tex., assignor to W. F. Curlee
Mfg. Co., Houston, Tex., a corporation of Texas
Filed Dec. 9, 1963, Ser. No. 328,997
7 Claims. (Cl. 151—69)

The present invention relates to fasteners which are to secure two members together such as a cover to a frame and particularly to fasteners which are to be retained within one of the members and are generally designated captive fasteners.

Captive fasteners have long been used. Many types of devices have been used to retain such fasteners within the bore of a member such as spring loaded plungers carried by the member and engaging a groove on the fastener shank and spring loaded plungers carried by the shank of the fastener and engaging a groove in the bore of one of the members. Also, retaining rings have been used. These retaining rings have generally been seated within a groove in the shank of the fastener and engage a shoulder between the bore and a counter bore through one of the members. Resilient frictional devices have been used and are generally positioned within the counter bore and frictionally hold the fastener within the member. In all of these devices the possibility exists that the fastener may escape from the member. This is particularly true in devices using retaining rings in which the shoulder engaged by the ring has a relatively small depth. In such cases such shallow shoulders will tend to compress the retaining ring back into the groove in the shank of the fastener and thereby allow the fastener to escape from the member in which it is to be retained.

The prior fasteners which rely on a counter bore within the member in which the fastener is to be retained have had the disadvantage that the counter bore is often substantially larger than the normal bore through which an ordinary fastener would be inserted and therefore the member is weakened.

Therefore an object of the present invention is to provide a captive fastener which will positively be retained within a member.

Another object of the present invention is to provide a captive fastener having a novel groove configuration for wholly or partially receiving a retaining ring.

A further object of the present invention is to provide a novel combination with a first member to be secured to a second member of a captive fastener assembly which is retained within said first member.

Another object of the present invention is to provide a captive fastener which will wholly contain a retaining ring during assembly and after installation will only partially contain such retaining ring.

Still another object of the present invention is to provide a captive fastener assembly including a fastening member and a retaining ring in which the retaining ring frictionally engages the inner wall of a first member through which said assembly extends.

A still further object of the present invention is to provide a captive fastener having a novel groove configuration for wholly containing a retaining ring during installation and only partially containing such retaining ring following installation.

Another object of the present invention is to provide a threaded captive fastener for securing a first member to a second member wherein the fastener will not force said members apart on unthreading said fastener from said second member.

A still further object is to provide a captive fastener assembly in which the fastener has a novel stepped groove for receiving a retaining ring.

Still another object of the present invention is to provide a novel captive fastener having a stepped groove with the smallest diameter portion of said groove positioned nearest the head of said fastener.

Another object of the present invention is to provide a captive fastener assembly which will be positively retained within a first member by engagement with a relatively narrow shoulder within said first member.

A still further object of the present invention is to provide a novel captive fastener to be positioned within a first member for securing the first member to a second member wherein the fastener when retracted, will be held in its retracted position within the first member.

Still another object of the present invention is to provide a captive fastener to be held within a first member by engagement of a split retaining ring with a shoulder formed between a counter bore and a bore through the first member wherein the counter bore is only slightly larger than the bore and therefore does not appreciably weaken the member.

A still further object of the present invention is to provide a novel captive fastener assembly which will be positively retained within a member in its retracted position wherein the fastener has a limited longitudinal movement free of friction to assist in the securing engagement of the fastener into a second member.

These and other objects of the present invention are more fully described and explained in the following description with relation to the drawings wherein:

FIGURE 1 is a plan view of a captive fastener constructed in accordance with the present invention.

FIGURE 2 is a plan view of a split retaining ring of the present invention.

FIGURE 3 is a sectional view illustrating the installation of the captive fastener assembly of the present invention into a first member through which the assembly is to extend.

FIGURE 4 is a sectional view illustrating the fastening of a first member through which the captive fastener assembly of the present invention extends to a second member.

FIGURE 5 is another sectional view illustrating the locking of the captive fastener assembly of the present invention within a first member through which the assembly extends.

Referring more in detail to the drawings the fastener illustrating in FIGURE 1 is shown to be a threaded machine screw type fastener and is generally designated 10 in FIGURE 1. Screw 10 is shown to be of the threaded type having an unthreaded shank but it should be understood that it is only used to illustrate one form of fastener to which the present invention has application. For example, fasteners which are threaded around less than half of their circumference and engage a bore that is threaded around less than half the circumference and fasteners using a pin and slot or cam and cam recess may be readily adapted to embody the novel principles of the present invention and provide a novel captive fastener. Screw 10 has a suitable head 12 of any desired shape for engagement with a tool for rotation of screw 10 and a shank 14. Flange 16 on head 12 provides shoulder 18 for engagement of the surface of a first member to be fastened by screw 10. Shank 14 is generally cylindrical near shoulder 18 and is provided with stepped groove 20. Stepped groove 20 is stepped in cross section and provides cylindrical surfaces 21 and 22 defining the bottom of groove 20 and walls 23 and 24 defining the sides of groove 20. The diameter of cylindrical surface 21 is less than the diameter of cylindrical surface 22 and surface 21 is nearer head 12 than surface 22. The remaining portion of shank 14 is threaded as at 25. If desired, shank 14 of screw 10 could be formed in three parts, an unthreaded part and a threaded part, which parts would be joined by a cylindrical member having a smaller diameter near the unthreaded part of shank 14 and presenting cylindrical surface 21 extending from wall 23 and a larger diameter joining the threaded part of shank 14 and presenting cylindrical surface 22 extending from wall 24.

The cylindrical member when joined to the unthreaded and threaded parts of shank 14 would thus provide screw 10 with the stepped groove 20. The relationship of the diameters of surfaces 21 and 22 is hereinafter more fully explained with reference to the installation and retention of screw 10 within a first member. The dimensions of screw 10 may be varied but the relationships between the dimensions which are hereinafter more fully set forth should at all times be maintained. It should be noted that the diameter of surface 21 may be larger than the root diameter of threads 25 if it is desired that the strength of shank 14 at groove 20 be greater than the strength of threads 25 to prevent a failure of screw 10 at groove 20.

Split retaining ring 26 is illustrated in FIGURE 2. Ring 26 is generally circular in shape and is provided with ends 28 and 30 which are spaced apart when ring 26 is free. Ring 26 is shown in the drawings to have an element which is circular in cross sectional shape but may have an element having any other suitable across sectional shape such as elliptical square, rectangular or keystone shape. Ring 26 should also be made from a material which has sufficient resiliency to allow ring 26 to be compressed inwardly until ends 28 and 30 touch without taking such permanent deformation as would render ring 26 inoperable.

In FIGURE 2 ring 26 is shown in its free position and for purposes of clarity it is to be understood that it has a free outer ring diameter, a free inner ring diameter, a width and a depth. The terms free outer ring diameter and free inner ring diameter are the diameters of the annular ring when it is unrestrained. The width as used herein is the dimension of the material in the same direction as the free ring diameters and the depth is the dimension of the material in a direction at right angles to the width. The width and depth are the cross-sectional dimensions of the element used to form ring 26 and when an element having a circular cross section is used the width and depth dimensions would obviously be the same. It is generally preferred that ring 26 be made to have a flat or planar configuration but if it is desirable for ease of fabrication, such as winding, ring 26 may be made to have a slight left-hand spiral. A left-hand spiral is herein specified on the assumption that threads 25 are right-hand threads and that the ring 26 therefore could not be unthreaded from shank 14. It should be noted that either a left-hand or a right-hand spiral may be used in the fabrication of ring 26 when the threads 25 do not extend completely to groove 20. In such instance the unthreaded portion of the shank between the threads 25 and the groove 20 would prevent the unthreading of ring 26 from shank 14.

When ring 26 is placed on screw 10, captive screw assembly 32 is completed. Normally ring 26 will have a free inner diameter which will allow the threads 25 of shank 14 to be readily inserted through ring 26. In FIGURE 3 first member 34 is shown in section. First member 34 is representative of any member which is to be fastened to a second member, such as a cover which is to be fastened by captive screw assembly 32 to a frame or body of a receptacle. One particular application of the present invention would be the fastening of a cover to an explosion-proof housing for electrical equipment in which the captive screw assembly 32 extends through the cover and threads 25 of screw 10 engage the frame of the housing. For purposes of clarity it is preferred that when used herein the term first member will refer to the member through which captive fastener is to extend and in which the fastener is to be retained. The term second member will refer to the member to which the first member is to be secured by engagement of threads within the second member or other suitable engaging means. It is also possible that the second member could be engaged by other types of engaging means than the threads 25 such as partial threads, key and slot and cam means as previously mentioned.

It is further contemplated by the present invention that if desired the fastener of the present invention could be made to be inserted within a member having a bore and a counter bore wherein the retaining ring will hold the fastener captive within such member and the remaining portion of the fastener will extend through a straight bore in another member and may be secured by threading a nut on that portion of the fastener extending above such other member or by any other suitable fastening means such as a wedge and slot arrangement. Such configuration is not shown in any of the drawings but may be readily visualized by viewing FIGURE 3 and assuming that head 12 of screw 10 is a nut threaded upon the shank 14 and the member to be secured is positioned between the upper surface of first member 34 and the lower surface of the nut.

First member 34 is provided with bore 36 and counter bore 38 which are axially aligned and extend from opposite sides of first member 34. Counter bore 38 being slightly larger in diameter than bore 36 provides shoulder 40 between bore 36 and counter bore 38. Both bore and counter bore 38 may be machined in first member 34 from the same side of first member 34 or from opposite sides of first member 34. In applications of the present invention where the fastener is to be secured within counter bore 38 and extend upwardly therefrom through bore 36 for securing a member to the upper surface of first member 34 it is preferred that counter bore 38 be relatively short in length so that the fastener will at all times extend above first member 34. The external surface 42 of first member 34 around bore 36 is suitably smoothed or spot-faced at 44 to provided a smooth surface for the engagement of shoulder 18 of screw 10 with surface 42.

As shown in FIGURE 3 captive screw assembly 32 has just been inserted into bore 36 in first member 34 and ring 26 is compressed into groove 20. From the figure it can be seen that the diameter of cylindrical surface 21 is small enough to receive ring 26 within groove 20 and allow ring 26 to pass through bore 36. Thus, the diameter of cylindrical surface 21 of groove 20 will have to be no larger than the inner ring diameter of ring 26 when it is compressed to have an outer ring diameter slightly less than the diameter of bore 36. The length of cylindrical surface 21 will have to be slightly larger than the depth of ring 26 so that ring 26 may be compressed into groove 20 around cylindrical surface 21 without interference from surface 22.

Both bore 36 and counter bore 38 may be machined in first member 34 from the same side of first member 34 or from opposite sides of first member 34. In applications of the present invention where the fastener is to be secured within counter bore 38 and extend upwardly therefrom through bore 36 for securing a member to the upper surface of first member 34 it is preferred that counter bore 38 be relatively short in length so that the fastener will at all times extend above first member 34.

After captive screw assembly 32 has been completely inserted into first member 34, then ring 26 will expand and engage the wall of counter bore 38 as shown in FIGURE 4. Then, with captive screw assembly 32 in such position, first member 34 will be positioned on second member 46 whereby tapped hole 48 in second member 46 will be in axial alignment with bore 36 and counter bore 38. Screw 10 will be turned so that threads 25 will engage the threads in tapped hole 48. With screw 10 completely tightened, shoulder 18 on screw 10 will engage the spot-faced surface 44 of first member 34 and thereby secure first member 34 to second member 46. This fastening is illustrated in FIGURE 4.

To remove captive screw assembly 32 from engagement with second member 46, screw 10 is turned to disengage threads 25 from the threads in tapped hole 48. FIGURE 5 illustrates the interference provided against the removal of captive screw assembly 32 from bore 36 and counter bore 38 in first member 34 when threads 25 are completely disengaged from the threads in tapped hole 48 in second member 46. In this position ring 26 has moved into position around cylindrical surface 22 because of the frictional engagement of ring 26 with the well of counter bore 38. As screw 10 is pulled from first member 34, ring 26 will engage shoulder 40 and be positioned partially within groove 20 on cylindrical surface 22 whereby ring 26 provides a positive interference to the removal of screw 10 from first member 34. To provide this interference the diameter of cylindrical surface 22 should be such that when ring 26 is positioned within groove 20 on surface 22 approximately one-half of the width of ring 26 extends beyond the diameter of shank 14. It is also preferred that the length of cylindrical surface 22 should be at least slightly larger than the depth of ring 26 to prevent ring 26 from being compressed and slipping into engagement with cylindrical surface 21 in groove 20. If the length of cylindrical surface 22 is longer than half of the depth of ring 26, such length will usually be sufficient to prevent the compressing of ring 26 out of engagement with shoulder 40. Cylindrical surface 22 may, however, be substantially longer than one-half the depth of ring 26 if it is desired that a substantial length of movement of screw 10 free of the friction of ring 26 against counter bore 38 is desired as hereinafter more fully explained. The diameter of counter bore 38 should be approximately the width of ring 26 larger than the diameter of shank 14. From these relationships it can be seen that ring 26 will engage shoulder 40 and groove 20 and retain screw 10 within first member 34. The diameter of counter bore 38 should be less than the outer free ring diameter of ring 26. Therefore, ring 26 when positioned within counter bore 38 will be slightly compressed and will frictionally engage the walls of counter bore 38 whereby it will only move when screw 10 is pushed. This frictional engagement will cause ring 26 to remain stationary within bore 38 and when screw 10 has been moved to a position as shown in FIGURE 5 and then released or pushed inward, ring 26 will engage wall 23 of groove 20 and maintain the threads 25 of screw 10 within counter bore 38 until the friction has been overcome. The length of free movement of screen 10 wherein the frictional resistance of ring 26 does not have to be overcome will depend on the length of cylindrical surface 22 and the position of ring 26 with relation to shoulders 23 and 24 before such movement is commenced. It should be noted that since groove 20 is substantially longer than the depth of ring 26 that screw 10 when installed in first member 34 will have some amount of free movement allowing ready engagement of threads 25 into tapped hole 48 before wall 23 of groove 20 engages the upper surface of ring 26. This free movement of screw 10 is advantageous in the starting of the engagement of screw 10 with a second member. To take advantage of the maximum length of this free movement screw 10 should be pushed through first member 34 until shoulder 18 rests on surface 42. This will move ring 26 to its extreme position toward second member 46. Screw 10 will then be retracted into first member 34 only a sufficient distance to allow it to properly engage second member 46. From this it can be seen that screw 10 will have a length of free movement toward second member 46 which is related to the length of cylindrical surface 22 and to the position of ring 26 in counter bore 38.

It is generally preferred that the length of engagement of threads 25 in tapped hole 48 should be less than the length of travel of screw 10 from the position shown in FIGURE 5 to the position shown in FIGURE 4 so that disengagement of threads 25 from second member 46 will not cause ring 26 to engage shoulder 40 and thereby cause captive screw assembly 32 to act as a jack screw to move first member 34 away from second member 46. It is contemplated that if such jack screw action is desired that such dimensions may be adjusted so that disengagement of captive screw assembly 32 from second member 46 will separate first member 34 from second member 46. Threads 25 will have to be longer than above specified to obtain such separation of members 34 and 46.

It should be noted that step groove 20 may be positioned within the unthreaded portion of shank 14 rather than between the unthreaded portion of shank 14 and threads 25. Such positioning of step groove 20 will allow the device to be used as a jack screw to obtain the separation of members 34 and 46 without the necessity of additional thread length of threads 25. It also may be desirable to have an unthreaded portion of the shank 14 both above and below the step groove 20 as this structure will eliminate the possibility of ring 26 unscrewing on threads 25.

First member 34 must have sufficient thickness in regard to the length of shank 14 so that ring 26 will always be positioned within counter bore 38 after installation of captive screw assembly 32. Also, the length of counter bore 38 will usually be substantially greater than the length of bore 36 unless jacking action is desired since the purpose of bore 36 is to provide shoulder 40 at the inner end of counter bore 38.

It should be noted that because of the relatively small size of shoulder 40 that shoulder 40 will engage ring 26 at a position outside the vertical centerline through the element of ring 26 and will tend to compress ring 26. With ring 26 being positioned on surface 22 within groove 20 and provided surface 22 has sufficient length as hereinbefore mentioned, this compression of ring 26 will be prevented and ring 26 will at all times prevent the removal of screw 10 from first member 34.

When, as previously mentioned, it is desired to use the present invention with the fastener acting as a stud, it is only necessary to provide a bore and relatively shallow counter bore within the member into which the fastener is to extend and provide a stepped groove and split retainer ring for holding the fastener captive within the counter bore. The other end of the fastener may be provided with suitable means to secure the fastener through another member on the shank of the fastener and a nut threaded onto the fastener threads and engaging the opposite side of the other member.

From the foregoing it can be seen that the present invention provides a novel captive screw assembly in which the screw is provided with a stepped groove to receive a retaining ring and allow the assembly to be installed through a bore having only a slightly larger diameter than the shank of the screw and thereafter such groove will prevent the ring from being compressed to pass out through such bore. Also, this invention provides a captive screw assembly which may be installed and retained within a first member which is to be secured to a second member by said assembly. The retaining ring will frictionally engage the wall of the bore through which the assembly extends and positions itself within the stepped groove so that it cannot be compressed on engagement with the shoulder in such bore.

The foregoing disclosure and description of the invention is illustrative and explanatory thereof, and various changes in the size, shape and materials, as well as in the details of the illustrated construction, may be made within the scope of the appended claims without departing from the spirit of the invention.

I claim:

1. A captive fastener to be held within a member having a bore, a counter bore and an annular shoulder at the juncture of said bore and said counter bore comprising,
   a shank,
   a stepped groove around said shank,
   a split retaining ring,
   one end of said shank being adapted to be inserted through said bore and into said counter bore of said member,
   the largest diameter portion of said stepped groove being nearest said one end of said shank,
   said ring being compressible into the smallest diameter portion of said stepped groove for insertion of said one end of said shank through said bore and into said counter bore,
   said ring having a free outer ring diameter larger than the diameter of said counter bore in said member and an inner diameter when in engagement with said counter bore smaller than the diameter of said shank whereby said ring provides a positive interference preventing removal of said shank from said bore of said member, said ring when compressed into engagement with the smaller of said cylindrical surfaces of said groove having an outer diameter less than the diameter of said bore in said first member,
   said ring when compressed into engagement with said larger of said cylindrical surfaces of said groove having an outer diameter larger than the diameter of said bore in said first member,
   said smaller diameter portion having a diameter less than that of said shank by an amount at least as great as twice the maximum transverse dimension of the cross section of said ring,
   said larger diameter portion having a diameter less than that of said shank by an amount less than twice said maximum transverse dimension of said ring; and 2. In combination with a first member having a bore and a counter bore of larger diameter than said bore and being aligned with said bore and a second member having an internally threaded hole, a captive screw assembly comprising,
   a screw having an enlarged head and a shank,
   said shank extending through said bore and into said counterbore and being threaded for threaded engagement with said threaded hole in said second member,
   a stepped groove in said shank having two cylindrical surfaces,
   the cylindrical surface nearest said head having a smaller diameter than the other of said cylindrical surfaces of said groove, and
   a resilient split retataining ring,
   said ring having a free outer ring diameter larger than the diameter of said counter bore in said first member and being position in said stepped groove and an inner ring diameters when said ring engages said counterbore smaller than the diameter of said shank,
   said ring when compressed into engagement with the smaller of said cylindrical surfaces of said groove having an outer diameter less than the diameter of said bore in said first member,
   said ring when compressed into engagement with said larger of said cylindrical surfaces of said groove having an outer diameter larger than the diameter of said bore in said first member,
   said smaller diameter portion having a diameter less than that of said shank by an amount at least as great as twice the maximum transverse dimension of the cross section of said ring,
   and said larger diameter portion having a diameter less than that of said shank by an amount less than twice said maximum transverse dimension of said ring.

3. The combination according to claim 2 wherein the threaded length of said shank is less than the depth of said counter bore in said first member whereby disengagement of said screw from said second member will occur before engagement of said ring with said shoulder between said bore and said counter bore in said first member.

4. The combination according to claim 2 wherein the length of said shank from said head to said groove and including the length of said groove is less than the depths of said bore and said counter bore in said first member whereby said ring positioned by said groove is always within said counter bore of said first member.

5. The combination according to claim 2 wherein said ring is sufficiently resilient to frictionally engage the wall of said counter bore after passing through said bore whereby said ring will be positioned in said groove over said smallest diameter cylindrical surface of said stepped groove when said screw is moving toward said second member and said ring will be positioned in said groove over largest diameter cylindrical surface of said stepped groove when said screw is moving away from said second member.

6. A captive screw assembly comprising,
   a screw having an enlarged head and a shank,
   the portion of said shank farthest from said head being threaded,
   a stepped groove in said shank between the threaded portion of said shank and said head having two cylindrical surfaces, and
   a resilient, split retaining ring disposed within said stepped groove,
   said ring normally having an outer diameter greater than that of said shank,
   the smaller diameter of said cylindrical surfaces being nearer said head,
   each of said cylindrical surfaces having a length at least as long as the depth of the element of said ring,
   said smaller diameter portion having a diameter less than that of said shank by an amount at least twice as great as the maximum transverse dimension of the cross section of said ring, whereby said ring may be compressed into said smaller diameter portion,
   and said larger diameter portion having a diameter less than that of said shank by an amount less than twice said maximum transverse dimension.

7. A captive screw assembly comprising,
   a screw having an enlarged head and a shank,
   the portion of said shank farthest from said head being threaded,
   a stepped groove in said shank between the threaded portion of said shank and said head, and
   a resilient, split retaining ring disposed within said stepped groove,
   said ring normally having an outer diameter greater than that of said shank,
   said stepped groove including a cylindrical surface nearer the threaded portion of said shank and a shoulder between said surface and said threaded portion of said shank, said cylindrical surface having a length sufficiently long to allow said surface to engage the inner portion of said split retainer ring when said ring is positioned against said shoulder and having a diameter less than that of said shank by an amount less than twice the maximum transverse dimension of the cross section of said ring, the remainder of said stepped groove having a diameter less than that of said shank by an amount at least twice as great as said maximum transverse dimension and being of sufficient length to accommodate said split retaining ring in compressed condition.

References Cited by the Examiner
UNITED STATES PATENTS

| | | | |
|---|---|---|---|
| 2,322,949 | 6/1943 | Lux | 85—8.8 |
| 2,469,349 | 5/1949 | Zeidler | 85—77 |
| 2,615,735 | 10/1952 | Heimann | 85—8.8 |
| 2,761,484 | 9/1956 | Sternick et al. | 151—69 |
| 2,865,076 | 12/1958 | Newton et al. | 85—8.8 |
| 2,948,317 | 8/1960 | Munro | 151—69 |
| 3,018,127 | 1/1962 | Dobrosielski | 151—69 |

EDWARD C. ALLEN, *Primary Examiner.*

CARL W. TOMLIN, *Examiner.*